UNITED STATES PATENT OFFICE.

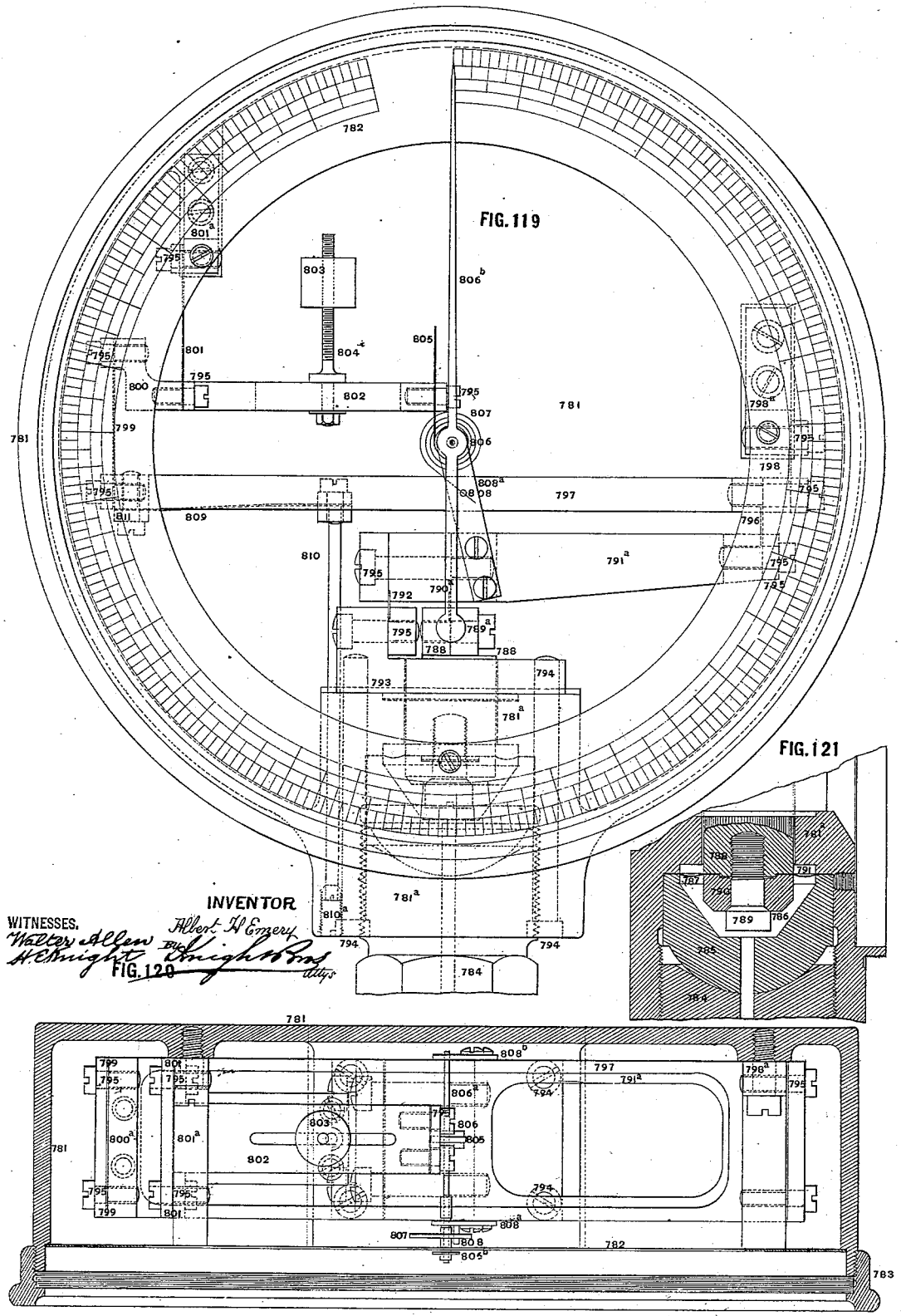

ALBERT H. EMERY, OF NEW YORK, N. Y., ASSIGNOR TO THE EMERY SCALE COMPANY, OF STAMFORD, CONNECTICUT.

PRESSURE AND VACUUM GAGE.

SPECIFICATION forming part of Letters Patent No. 278,909, dated June 5, 1883.

Application filed February 5, 1881. (No model.)

*To all whom it may concern:*

Be it known that I, ALBERT H. EMERY, of the city, county, and State of New York, have invented certain new and useful Improvements in Pressure and Vacuum Gages, of which the following is a specification.

This invention relates to pressure or vacuum gages. The gage is constructed with an annular diaphragm receiving the pressure and clamped at its periphery to a suitable casing and at its center to a column, by which the pressure in either direction is transmitted to a system of levers through the medium of flexible transmitting-plates, flexible plates being also used to form the fulcrums of the levers. An adjustable weight is applied to one of the levers to counteract the weight of the principal levers and their inertia under motion. The motion from the final transmitting-lever is communicated to a rotary indicator through the medium of an elastic metallic band. The final transmitting-lever is connected to the case by a long fulcrum-plate, and is constructed with an upwardly-projecting heel to afford attachment for the flexible plate, which connects it with the intermediate lever at a point above the level of the fulcrum attachment. The pointer is adapted to rotate in either direction to indicate either pressure or vacuum, and the dial may be suitably graduated therefor.

This invention is represented in the accompanying drawings by three figures, numbered 119 to 121, inclusive. Figure 119 is a front elevation of a gage illustrating the invention. Fig. 120 is a horizontal section of the same. Fig. 121 is a vertical section of the base, showing the pressure-diaphragm and its connections.

781 represents a cylindrical casing provided with a dial, 782, with a glazed front, 783, attached in any preferred manner.

784 is a screw-plug for coupling the gage to any object in which is a vacuum or pressure to be measured. The plug 784 screws against a sealing-plug, 785, clamping at its periphery an annular diaphragm, 787, which is clamped at its center to a column, 788, by means of a screw, 789, and clamping-plate 790. The joint between the screw-plug 784 and the sealing-plug 785 is of such form as to cause the former to bear at or near the center of the latter in order to produce a substantially uniform pressure of its annular face on all parts of the margin of the diaphragm 787. The diaphragm will be seen to form a flexible air-tight division between the chamber 786, beneath it, and the chamber 791 above the latter being exposed to atmospheric pressure while the chamber 786 is in communication with the vacuum, where the instrument is used as a vacuum-gage, and with the pressure to be measured, if it be a pressure-gage. In the case of a vacuum-gage, the atmosphere presses down the column 788. In the case of a pressure-gage, the pressure in the chamber 786, acting in opposition to the atmosphere, forces up the column, the pointer hereinafter described being adapted to move in either direction, to indicate the degree of either pressure or vacuum, as the case may be. The column 788 communicates by a thin flexible plate, $790^a$, secured thereto by a screw-clamp, $789^a$, with a lever, $791^a$, fulcrumed by a thin flexible plate, 792, to the fulcrum-bracket 793. This bracket may be formed permanently within the casing or attached thereto by screws 794. The clamp-plates and screws for holding the thin flexible plate 792 by its respective edges are shown at 795, the same number being used to indicate similar clamp-plates and screws applied to other flexible plates, hereinafter referred to. The free end of the lever $791^a$ communicates through a thin flexible plate, 796, with a secondary lever, 797, fulcrumed by a thin plate, 798, and bracket $798^a$ to the case 781, and connected by a long flexible plate, 799, with an upwardly-projecting fulcrum-bracket, 800. The bracket 800 is screwed to the heel of a lever-frame, 802, or may be made in one therewith, and is suspended by a flexible plate, 801, clamped to an attaching-bracket, $801^a$, which is screwed to the case 781. The bracket 800 is so constructed that the free parts of the fulcrum-plates 799, or the parts exposed to flexure, reach above the lower flexible parts of the fulcrum-plates 801. This construction gives an increasing fulcrum-distance between the fulcrum-plates 799 and 801 as the lever 802 rises. This tends to hasten the rotation of the needle or indicator, which is retarded by other increasing resistances. The lever-frame 802 carries a sensitive weight, 803, which has a vertical adjustment on its standard 804, while the latter has horizontal adjustment on the lever 802. By means of the horizontal adjustment the weight 803 may be made to balance the weight of the levers, and by means of the vertical adjustment it is made to exert a greater or less accelerating effect on the action of the needle or indicator, as the higher it is placed the more rapidly it approaches the suspending fulcrum-plates 801 as the lever 802 rises, and thus accelerates the movement of the indicator. These two adjustments permit the making of gages having substantially uniform graduations. This is assisted by the form of the heel-piece 800, as mentioned, and still further by varying the width, length, and thickness of part or all of the fulcrum-plates.

To the extremity of the lever-frame 802 is clamped, adjustably, a flexible metallic strap, 805, which is coiled at its other end around a drum, 806, on the shaft 806$^a$ of the indicator 806$^b$, so as to rotate the said indicator when the column is moved in either direction. The draft of the strap 805 is resisted by a hair-spring, 807, connected at one end to the shaft of the indicator and at the other end to a pin, 808, on one of the brackets, 808$^a$, in which the indicator has its bearings. The brackets 808$^a$ and 808$^b$ are mounted on the lever 791$^a$. The pressure is further resisted in either direction by a spring, 809, (shown by dotted lines in Fig. 119,) attached adjustably at one extremity to the free end of the lever 797 by a clamp, 811, and at the other end to a rod, 810, which is made of metal of different expansibility from the material of the case, and is supported adjustably in the neck 781$^a$ of said case by a screw, 810$^a$, so as to be moved up or down to set the indicator as required.

The dial may be provided with two sets of graduations, reading in each direction, for indicating either pressure or vacuum. In practice it is preferred to set the diaphragm 787 with its concave side toward the predominant pressure, as described in another application, according as the gage is to be used for purposes of pressure or vacuum. The last lever, 802, and its attached weight are made sufficiently heavy to counterbalance the weight of levers 791$^a$ and 797. The upwardly-projecting weight will be seen to offer an increasing or decreasing resistance to the motion, according as the lever to which it is attached is moved up or down, and the extent or ratio of this resistance may be regulated as required by the horizontal or vertical adjustment of the standard and weight.

Whatever novel subject-matter I have set forth and not claimed or attempted to claim herein I have claimed or attempted to claim in other applications, or have reserved to be claimed in future original applications.

The following is here claimed as new:

1. In a pressure or vacuum gage, the combination of the annular diaphragm 787, clamping-piece 790, and screw 789 with the pressure-column 788, substantially as set forth.

2. The combination of the gage-case 781, annular diaphragm 787, clamping-piece 790, screw 789, pressure-column 788, transmitting-plate 790$^a$, and load-lever 791$^a$, substantially as and for the purposes set forth.

3. In a pressure or vacuum gage, the lever 802, constructed with an upwardly-projecting heel, 800, to afford an attachment for the connecting-plate 799, above that of the fulcrum-plate 801, substantially as set forth.

4. In combination with a suitable pressure-column, one or more transmitting-levers, and an indicator actuated thereby, a weight mounted on one of the transmitting-levers through the medium of a projecting arm or standard, and having a variable effect by reason of the elevation or depression of the lever on which it is mounted.

5. In combination with a suitable pressure-column, one or more transmitting-levers, and an indicator actuated thereby, a weight mounted on one of the transmitting-levers through the medium of a projecting arm or standard, and horizontally adjustable for the purpose of balancing the transmitting lever or levers and connections, substantially as set forth.

6. In combination with a suitable pressure-column, one or more transmitting-levers, and an indicator actuated thereby, a weight mounted on one of the transmitting-levers through the medium of a projecting arm or standard, and adjustable vertically, whereby the ratio of variation in the effect of the weight by the movement of the lever on which it is mounted may be varied, as explained.

7. In combination with a lever having an elevated and projecting heel, to which its moving fulcrum is attached, the compensating-weight 803, mounted through the medium of a projecting arm or standard on the said lever, substantially as and for the purposes set forth.

8. In a pressure or vacuum gage, the combination, with a pressure-column, a system of transmitting-levers, and a rotary indicator, of a band, 805, transmitting motion from one of the levers to the rotary indicator, substantially as set forth.

9. The combination, in a pressure or vacuum gage, of a pressure-column, one or more transmitting-levers, a flexible connecting plate or plates, a transmitting-band, and a rotary indicator, substantially as set forth.

10. The combination of a pressure-column, one or more transmitting-levers, a coiled transmitting-band, and a spring acting in opposition to the said transmitting-band, as set forth.

ALBERT H. EMERY.

Witnesses:
LUDWIG HAILER,
MAHLON RANDOLPH.